Oct. 23, 1956     F. W. BIRELEY     2,767,644
APPARATUS FOR THE EXTRACTING OF JUICE
Filed Aug. 21, 1950     9 Sheets-Sheet 1
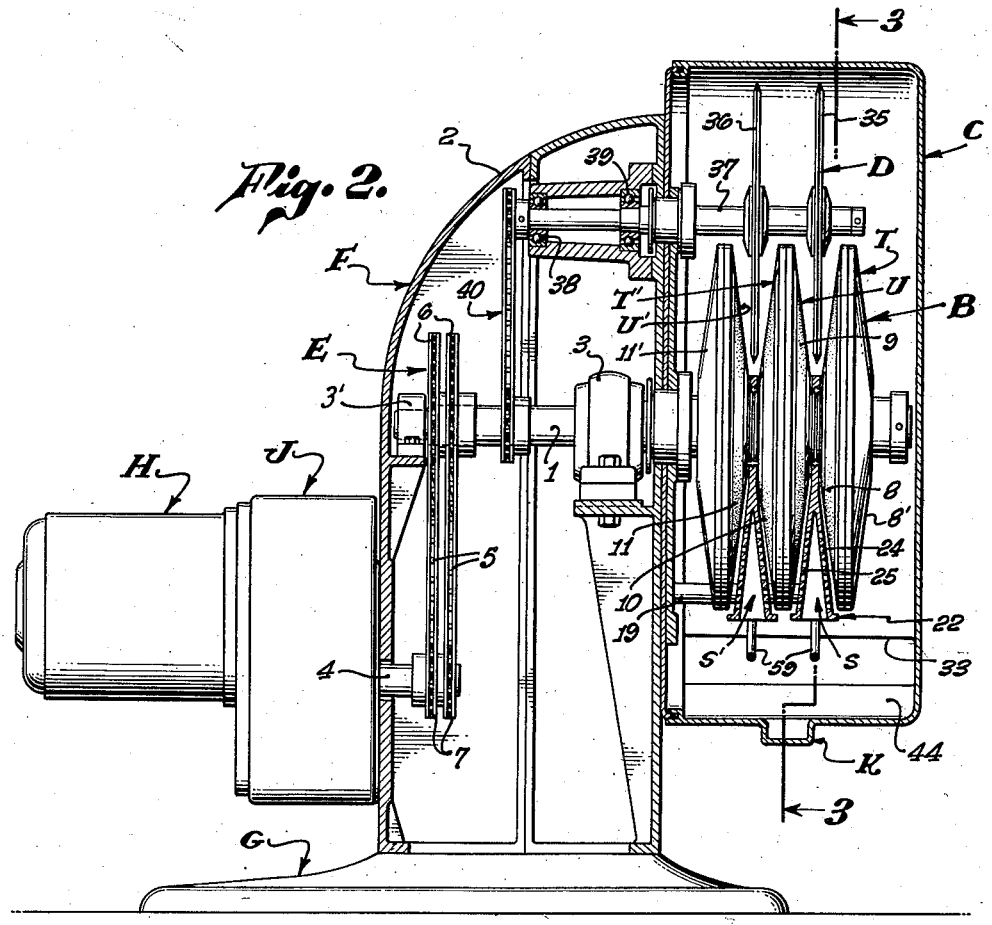
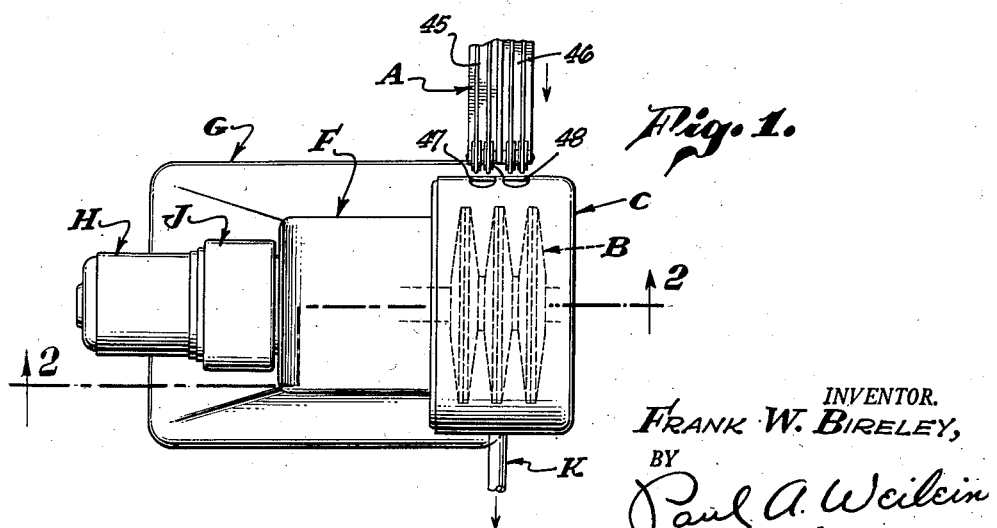
INVENTOR.
FRANK W. BIRELEY,
BY
Paul A. Weilein
ATTORNEY.

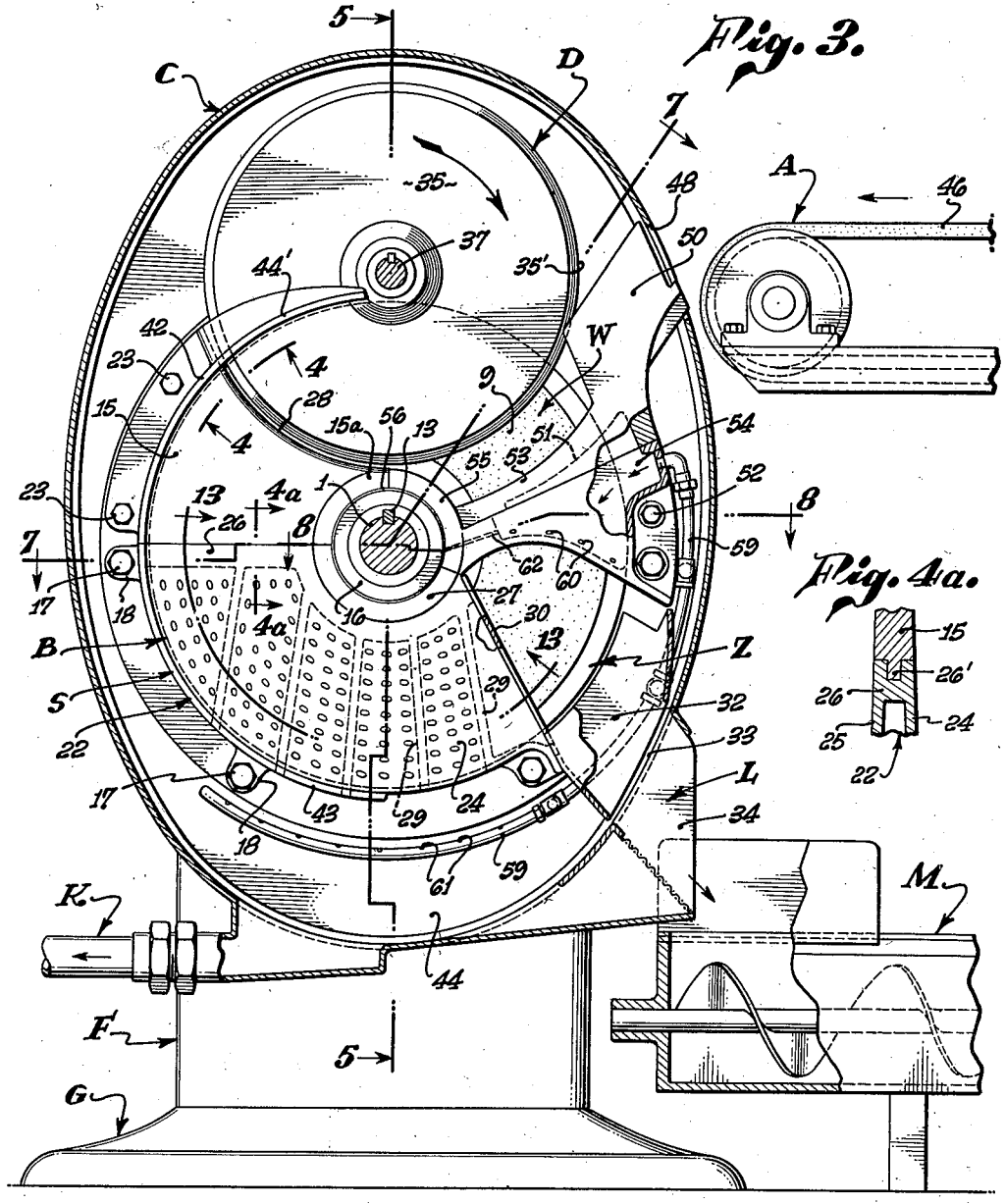
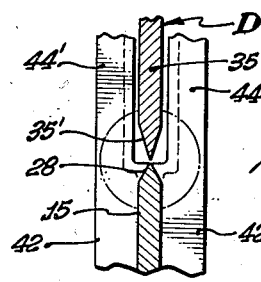

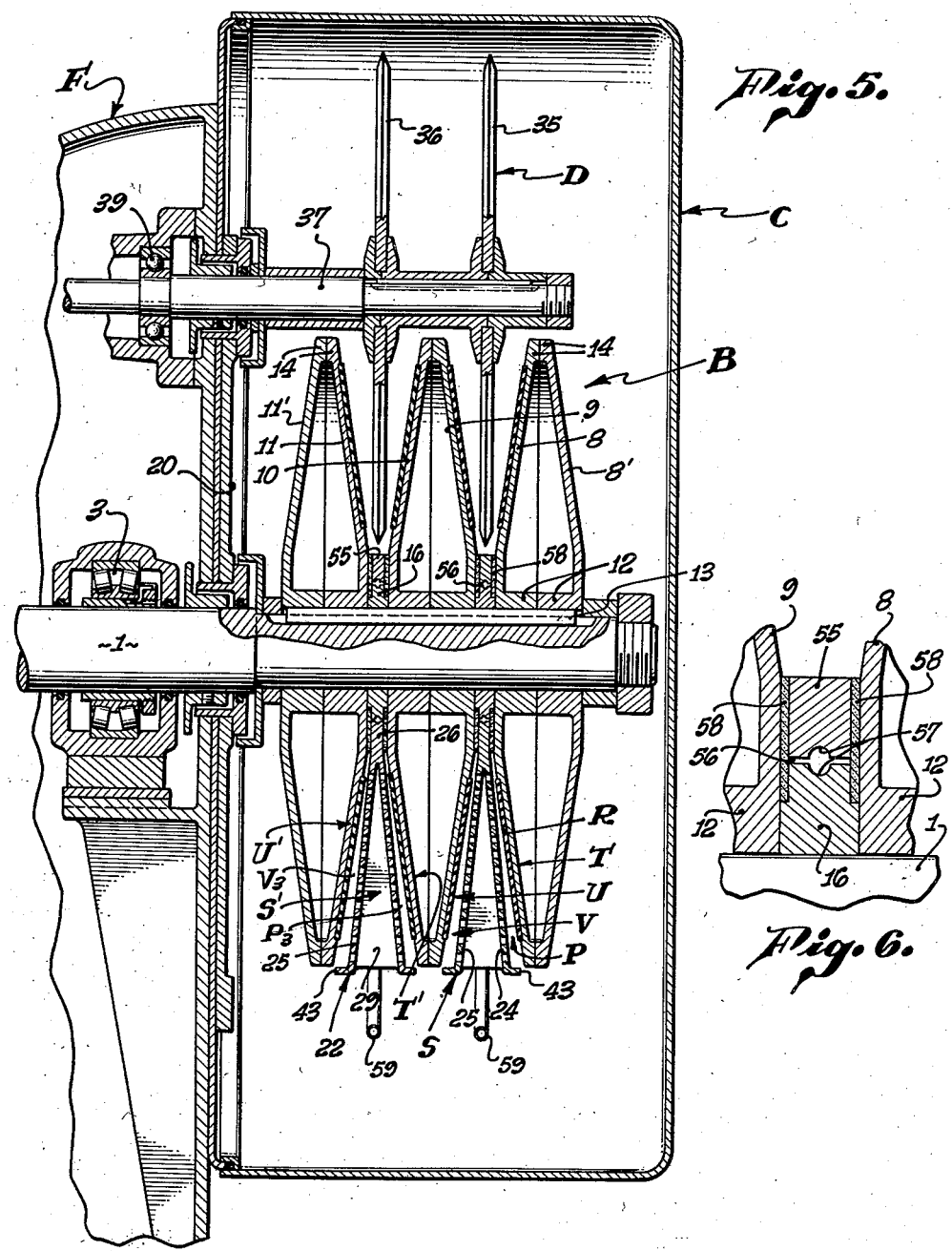

Oct. 23, 1956  F. W. BIRELEY  2,767,644
APPARATUS FOR THE EXTRACTING OF JUICE
Filed Aug. 21, 1950  9 Sheets-Sheet 4
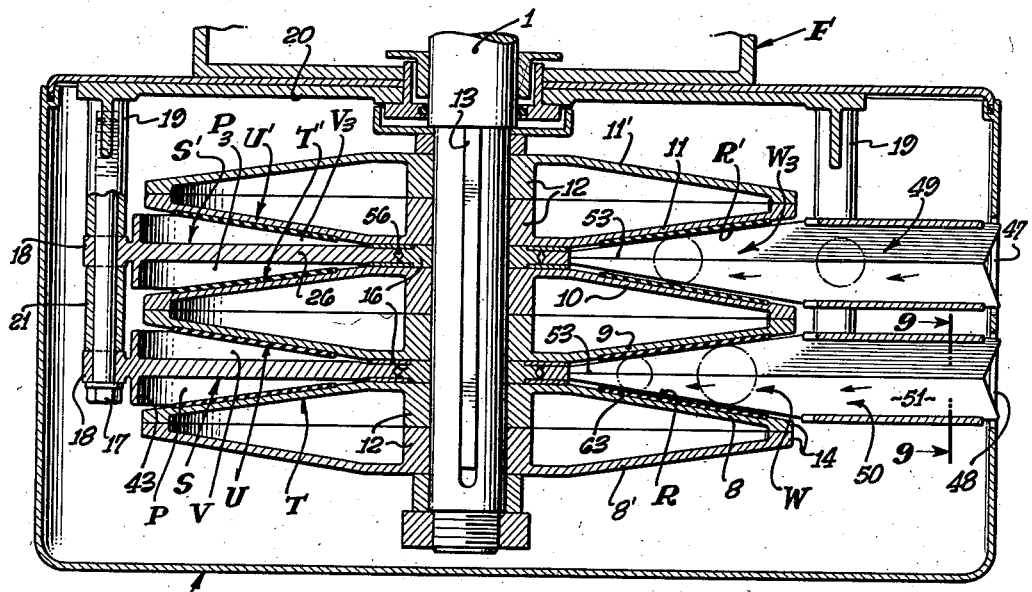
Fig. 7.
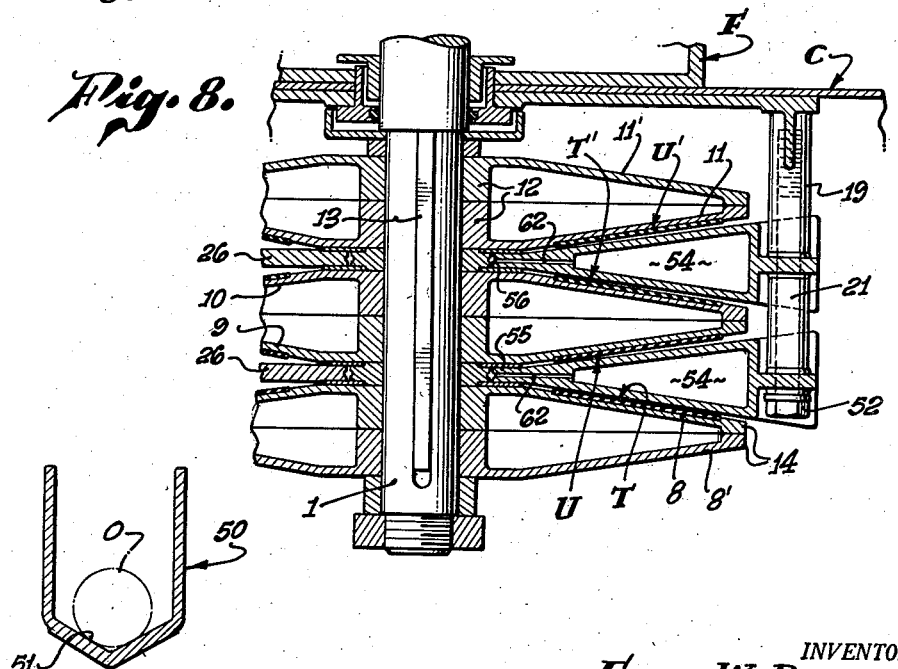
Fig. 8.
Fig. 9.
INVENTOR.
FRANK W. BIRELEY,
BY
Paul A. Weilein
ATTORNEY.

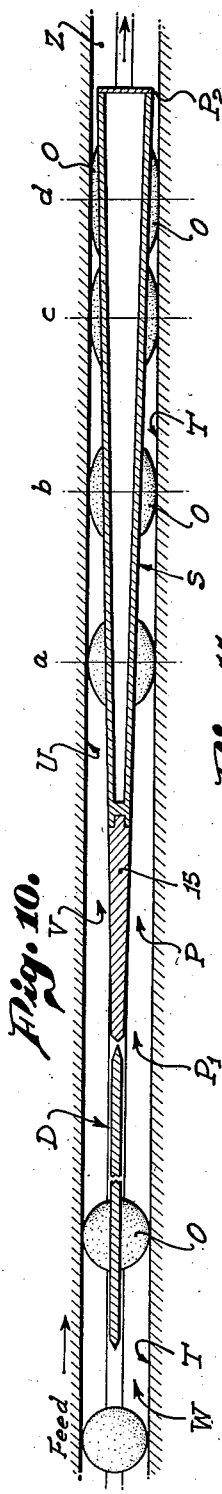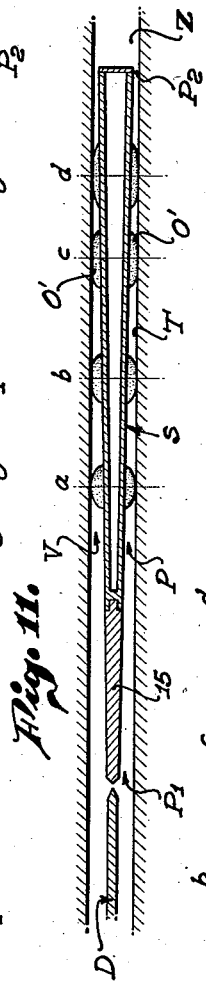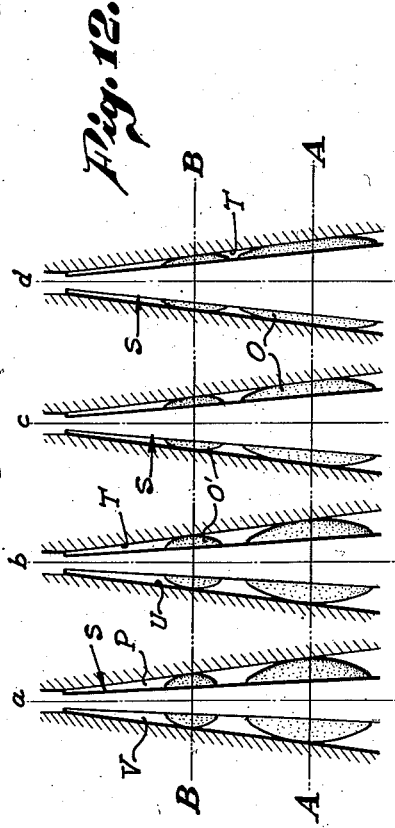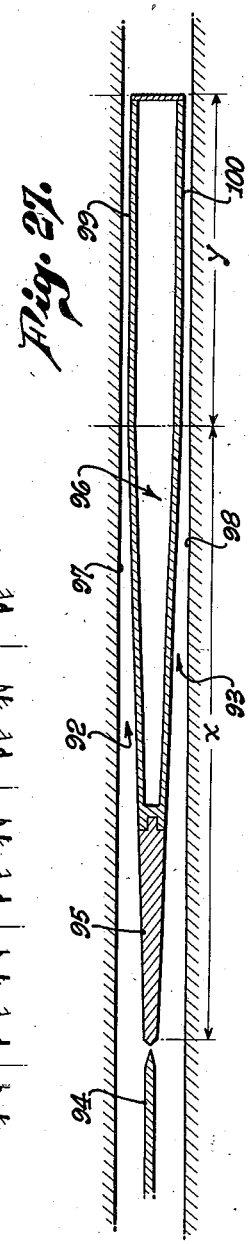

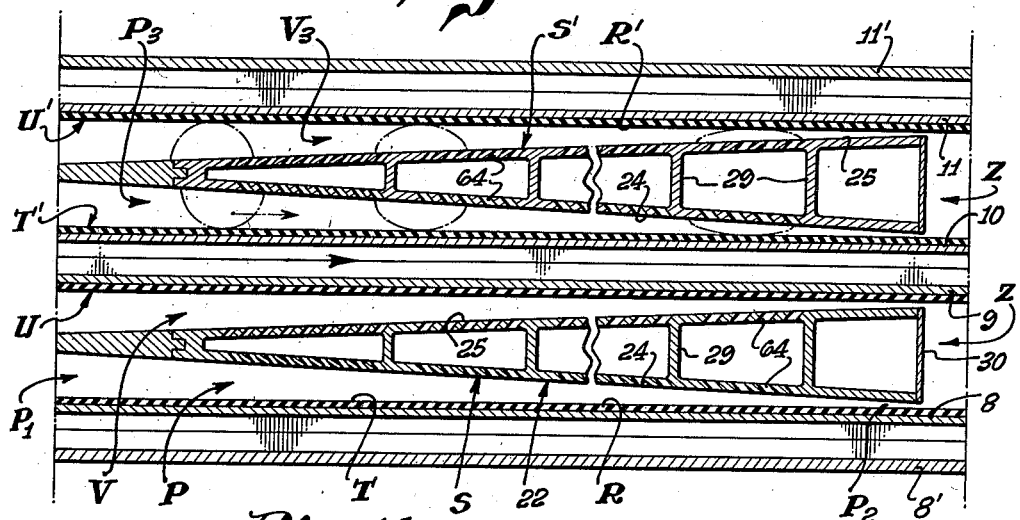
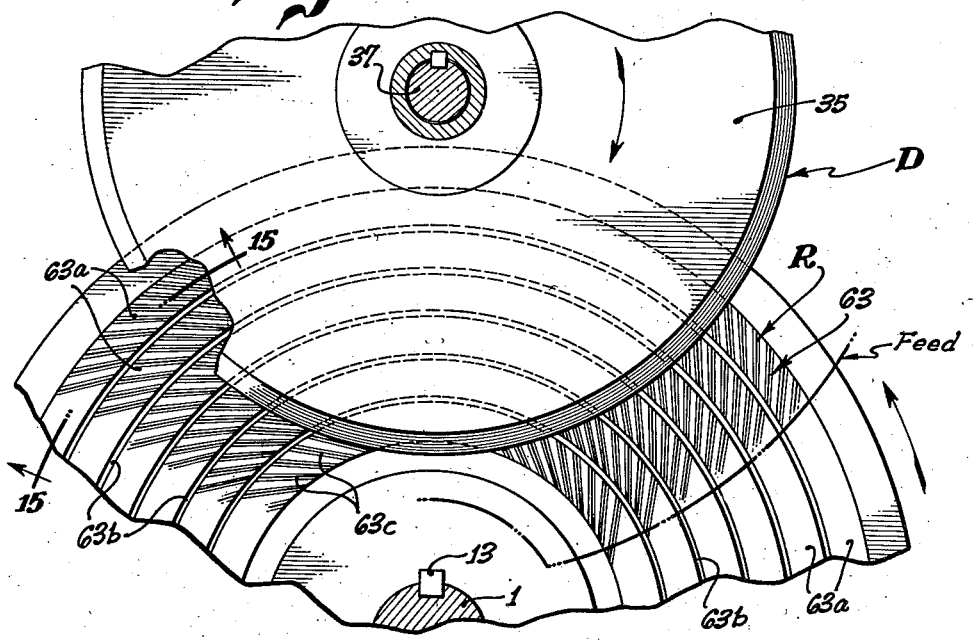
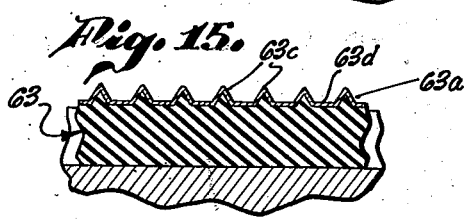

Oct. 23, 1956 F. W. BIRELEY 2,767,644
APPARATUS FOR THE EXTRACTING OF JUICE
Filed Aug. 21, 1950 9 Sheets-Sheet 7

INVENTOR.
FRANK W. BIRELEY,
BY
Paul A. Weilein
ATTORNEY.

Oct. 23, 1956     F. W. BIRELEY     2,767,644
APPARATUS FOR THE EXTRACTING OF JUICE
Filed Aug. 21, 1950     9 Sheets-Sheet 8
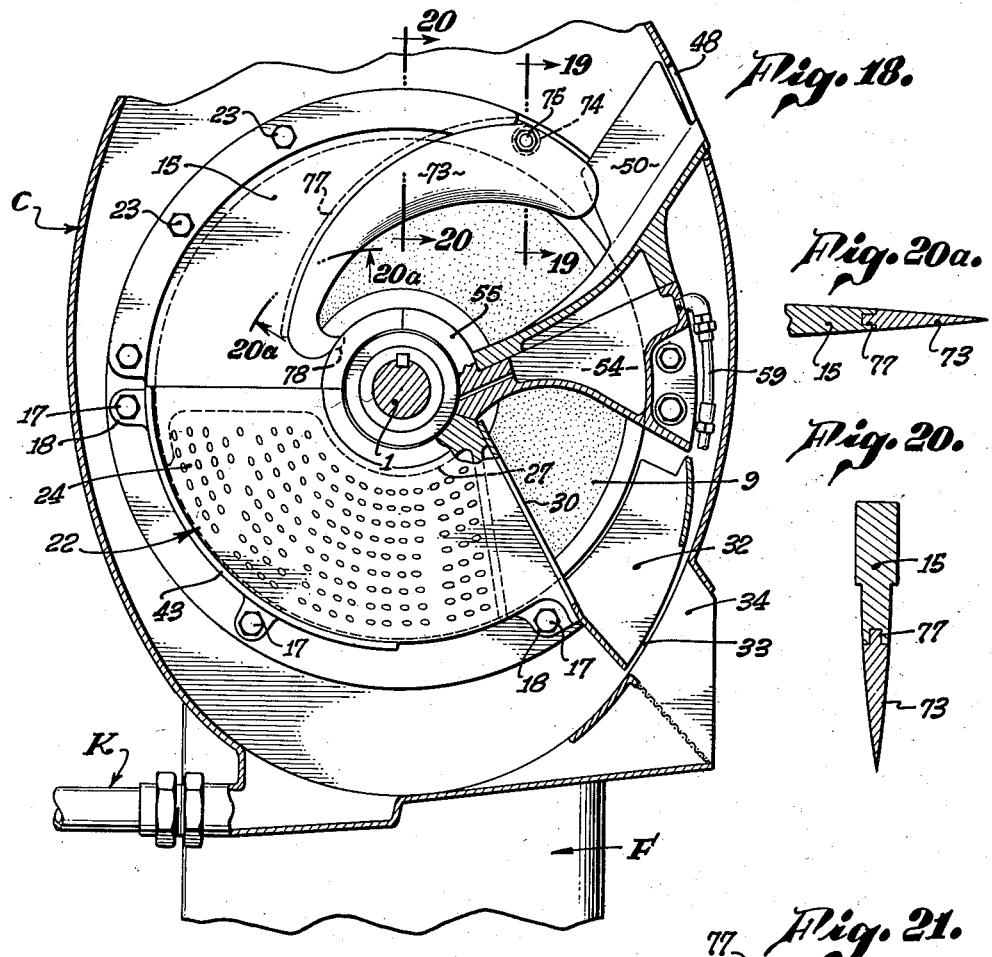
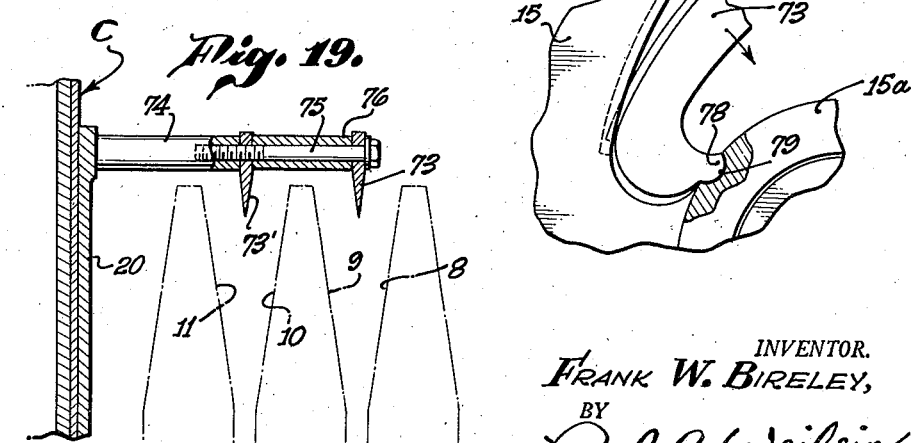
INVENTOR.
FRANK W. BIRELEY,
BY
Paul A. Weilein
ATTORNEY.

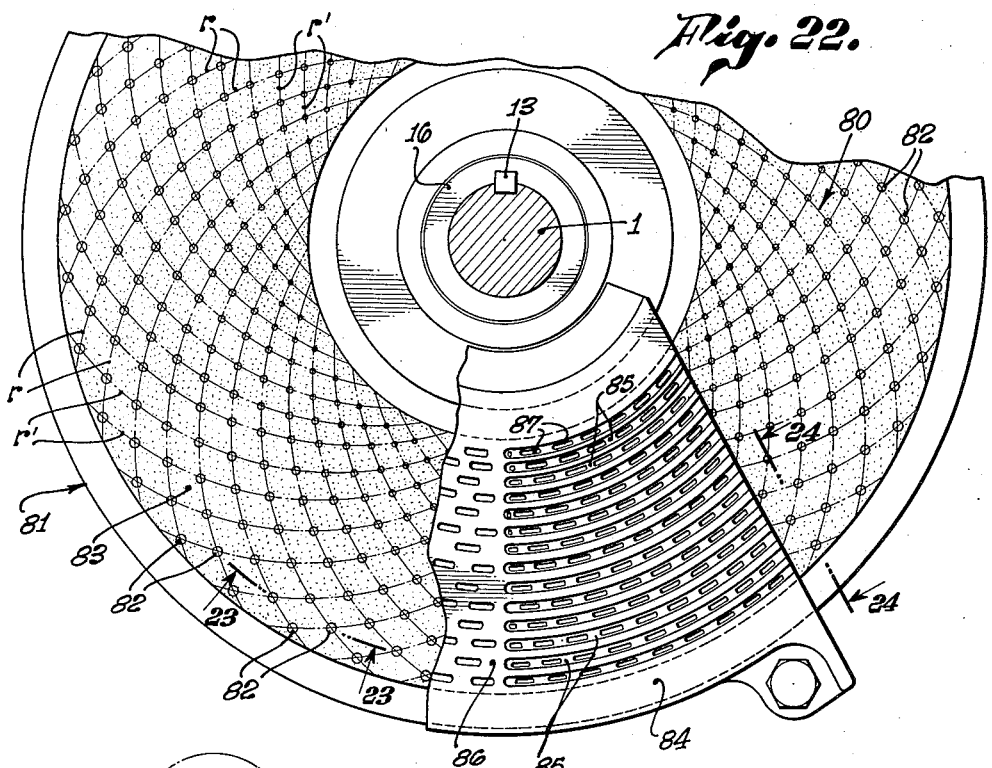
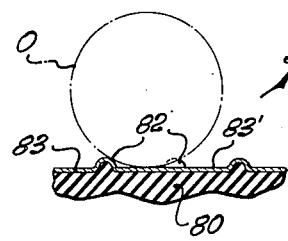
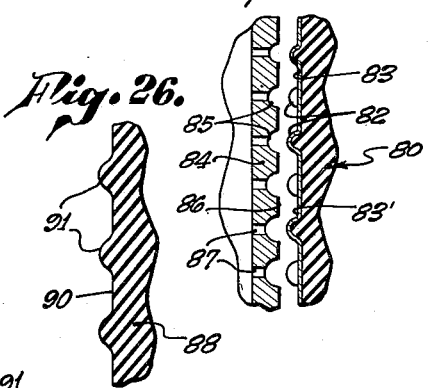
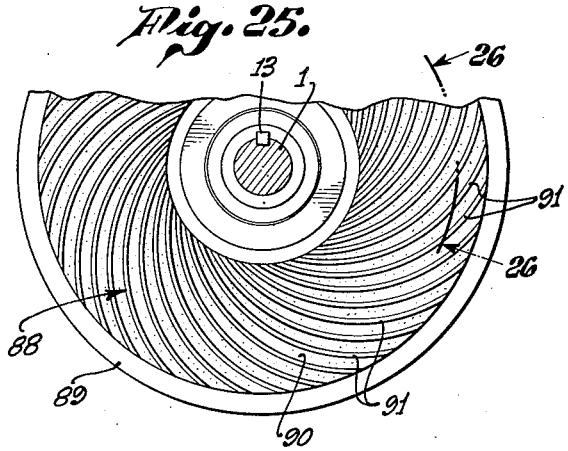

United States Patent Office 2,767,644
Patented Oct. 23, 1956

2,767,644

APPARATUS FOR THE EXTRACTING OF JUICE

Frank W. Bireley, North Hollywood, Calif.

Application August 21, 1950, Serial No. 180,658

30 Claims. (Cl. 100—97)

This invention relates to juice extracting apparatus, more particularly apparatus for extracting juice from citrus fruits.

Juice extracting apparatus for citrus fruits, to which whole fruit, for example oranges, lemons, grapefruit, or the like are fed, is known, such apparatus comprising cutting means for halving the fruit which is then advanced between a pair of converging pressure surfaces, so that the fruit halves are flattened and the juice expressed. For this purpose, the halved fruit is positioned with its cut faces against one of the pressure surfaces which is apertured to permit escape of the juice, at least one of the surfaces being movable for advancing the fruit.

An example of apparatus of the foregoing type is shown in United States Patent No. 1,159,187, issued November 2, 1915, to F. M. Day.

It is an object of this invention to provide improved apparatus of the character described which without adjustment or alterations is capable of handling fruit having a large range of sizes.

It is another object of this invention to provide such apparatus wherein the expression of objectionable amounts of rind oils as an incident of pressing the fruit is reduced to a minimum.

It is another object of this invention to provide such apparatus wherein after the initial halving of the fruit, the rind is not cut, pierced or abraded, thus preventing contamination of the juice by objectionable rind oils or juices.

Another object of this invention is to provide such apparatus wherein variations in the thicknesses of the fruit peel or rind are automatically compensated for so that creation of excessive pressures incident to pressing the fruit are avoided.

Another object of this invention is to provide such apparatus in which one of the pressure surfaces is resilient, to accommodate peel or rind of different thicknesses.

It is another object of this invention to provide such apparatus wherein the cutting means is so arranged that the cut sections of fruit are delivered directly to the pressure surfaces with the cut faces appropriately positioned, without the need of auxiliary positioning means.

It is another object of this invention to provide such apparatus wherein the juice obtained at successive stages of the pressing may be segregated.

It is another object of this invention to provide such apparatus wherein a novel form of stationary cutter is utilized for positively halving the fruit.

Another object of this invention is to provide such apparatus employing a rotating cutter, and so arranged as to prevent displacement of the fruit from its path of advance by the cutter.

It is another object of this invention to provide such apparatus which may be readily cleaned and sterilized, and without the need of disassembly.

It is an object of this invention to provide improved apparatus of this type which is simple, has few moving parts, which requires a minimum amount of attention on the part of the operator, and which is capable of a large output.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of of the invention is best defined by the appended claims.

Referring to the drawings:

Figure 1 is a top plan view of a juice extracting apparatus embodying the present invention;

Figure 2 is a longitudinal sectional view on an enlarged scale, taken substantially as indicated by line 2—2 of Figure 1;

Figure 3 is a sectional view, partly in elevation on a further enlarged scale, taken substantially as indicated by line 3—3 of Figure 2;

Figure 4 is a detail section, taken on the line 4—4 of Figure 3;

Figure 4a is a detail section on line 4a—4a of Figure 3;

Figure 5 is a fragmentary vertical section, taken on the line 5—5 of Figure 3, and on a further enlarged scale;

Figure 6 is a detail of a portion of the hub structure shown in Figure 5;

Figure 16:
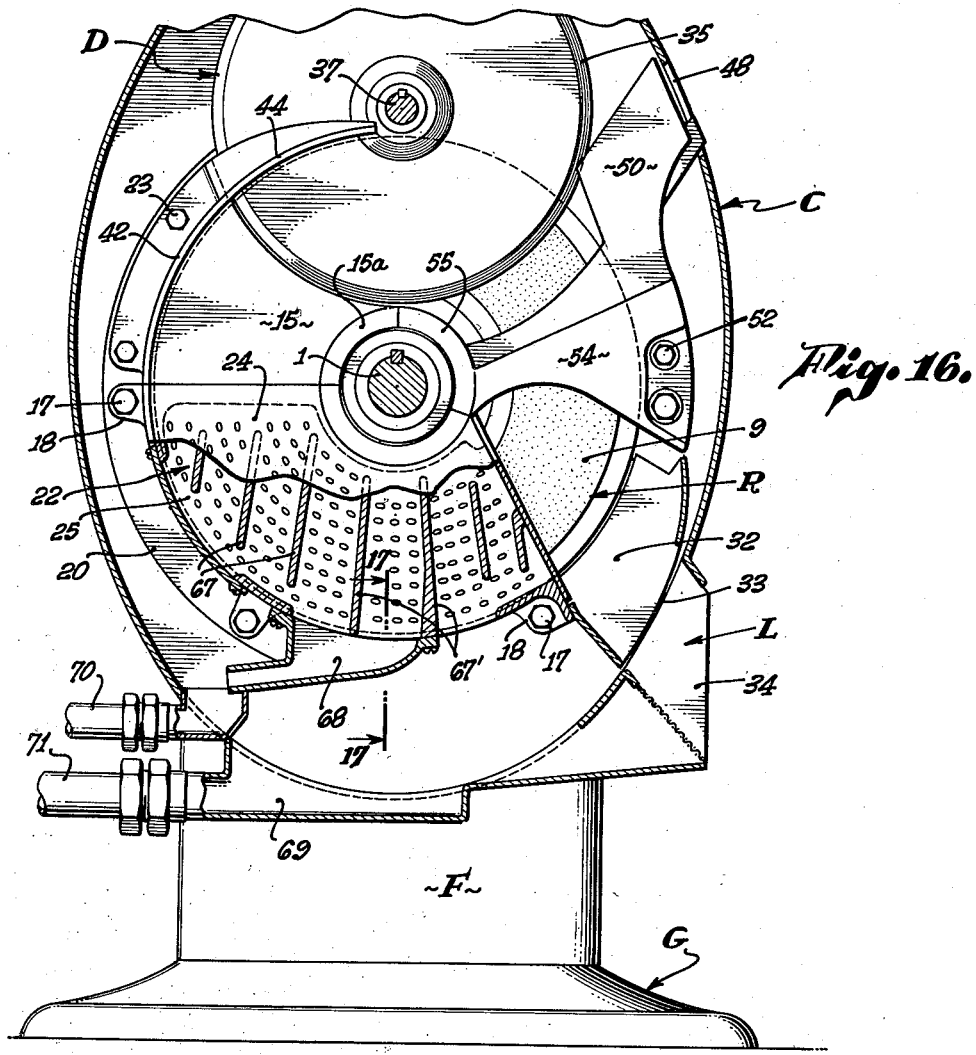
Figure 17:
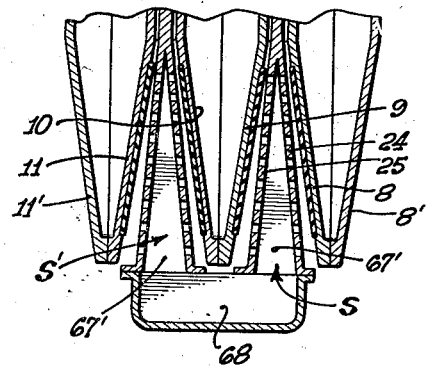

Figures 7 and 8 are sections, taken on lines 7—7 and 8—8 of Figure 3, and on a further enlarged scale;

Figure 9 is a detail section, taken on line 9—9 of Figure 7;

Figures 10 and 11 are diagrammatic views showing the complete operation of the apparatus, being taken on the lines A—A and B—B respectively of Figure 12;

Figure 12 constitutes a series of diagrammatic sectional views as taken on the lines a, b, c and d of Figures 10 and 11;

Figure 13 is a developed sectional view taken substantially as indicated on the line 13—13 of Figure 3, on an enlarged scale, portions of the apparatus being omitted for clarity of illustration;

Figure 14 is a fragmentary view partly diagrammatic, useful in explaining the operation of the apparatus;

Figure 15 is a detail section taken on the line 15—15 of Figure 14;

Figure 16 is a transverse section similar to Figure 3 but shownig a modified form of the invention;

Figure 17 is a detail section taken on line 17—17 of Figure 16;

Figure 18 is a transverse section similar to Figure 3, but showing another modified form of the invention;

Fig. 19 is a fragmentary sectional view partly in elevation showing the manner of mounting the knife and taken substantially on the line 19—19 of Fig. 18, with portions of the rotatable disks shown by dot-dash lines;

Fig. 20 is a sectional view taken substantially on the line 20—20 of Fig. 18 and omitting parts other than the knife for clarity of illustration; and Fig. 20a is a fragmentary sectional view of the lower portion of the knife taken substantially on the line 20a—20a of Fig. 18, and omitting parts other than the knife.

Figure 21 is a detail of the manner of assembling the knife as shown in Figure 18;

Figure 22 is an enlarged fragmentary section of a modified form of the movable and stationary pressure members;

Figures 23 and 24 are detail sections taken on lines 23—23 and 24—24 of Figure 22;

Figure 25 is a fragmentary elevational view of another modified form of rotary pressure member;

Figure 26 is a sectional view taken on the line 26—26 of Figure 25; and

Figure 27 is a diagrammatic view similar to Figure 10 embodying a modified form of pressure passage.

Briefly, the apparatus comprises a pair of relatively movable pressure members between which cut sections of the fruit are moved to express the juice therefrom, the members having opposed surfaces converging in a direction transverse to the direction of movement of the fruit, to form a groove-like pressure passage, path or channel. The distance between the opposed surfaces also decreases progressively so that the effective width of the pressure passage decreases from one end to the other. Cut sections of citrus fruit, such as oranges, for example in half portions, are fed into the pressure passage at its wide end and in the general direction in which the surfaces converge with the cut face of each piece of fruit against one of the surfaces. The fruit is stopped by engaging or wedging between the converging surfaces, so that it is confined therebetween. The relative movement of the surfaces causes the fruit to advance in the pressure passage toward the narrow end thereof, thus compressing the fruit and driving out the juicy material, after which the spent fruit is discharged from between the surfaces.

One of the aforesaid relatively movable members is stationary and has a surface on each side thereof of lesser extent in the direction of movement of the fruit than the surface of the movable member opposed thereto. Consequently, by mounting a second movable member corresponding to the first described movable member, in opposed relation thereto, with the stationary member therebetween, and in having the opposed surfaces of the two movable members converged in a direction transverse to the direction of movement of the fruit, and the opposed surfaces of the stationary member and the second movable member converged in the direction of said movement and transversely thereof, there is provided a second pressure path and a feed passage which latter is in advance of and serves the two pressure paths.

As whole fruit is fed into the feed passage it will wedge between the opposed surfaces of the two movable members at various positions according to size and be moved against knife means which bisects the fruit and guides the halves into the two pressure paths where the halves are wedged and stopped therein according to size and then compressed and the juice expressed as the movable members advance the fruit through said paths.

With reference to Figures 1, 2 and 3, it will be seen that one embodiment of this invention generally comprises a feed means A for continuously feeding whole fruit to a juice expressing means B enclosed by a housing C wherein knife means D in cooperation with the expressing means is operative to bisect the fruit and direct the fruit halves into the expressing means.

The knife means D and the expressing means B are operated by a drive means E in a housing F mounted on a base G and supporting housing C. An electric motor H, through a gear reduction unit J, operates the drive means E. The juice drops into the lower end of the housing C where it is taken off for storage or other treatment by conduit means K. The spent fruit is discharged from the expressing means B through a discharge chute L into a take-off conveyor M.

The juice extracting means B is constructed and arranged to effect a continuous and large volume extraction of juice from cut sections of fruit continuously fed thereto in various sizes over a wide size range without requiring adjustment or the piercing or other treatment of the rind such as would release rind oils or other undesirable components of the fruit in amounts and of such nature as to contaminate the juice or prove difficult of removal from the juice.

Before describing the appartus in detail, it will be broadly defined. Accordingly, it will be seen with reference to Figures 10, 11, 12 and 13 that the apparatus provides a pressure path P between opposed surfaces of relatively movable members S and T which coact to advance the fruit in said path whereby juice will be expressed.

As a means for gripping and advancing the fruit in various sizes through the path P, the opposed surfaces of members S and T converge in a direction transverse to the direction of movement of the fruit, thus making the path of a V-shape in cross section whereby the fruit in various sizes will wedge between said surfaces.

As a means for gradually increasing the pressure on the fruit so as to express juice as the fruit is advanced along the path P, said path is constricted in the direction of its length by having the opposed surfaces of members S and T gradually converge in the direction of travel of the fruit. Thus, the path P is provided with a wide inlet end $P_1$ and a narrow outlet end $P_2$.

In order that the fruit sections will be gripped and advanced through the path P without piercing or abrading the rind and so as to prevent excessive pressures on fruit sections having rinds of different thicknesses, at least one of the members S and T is resiliently contacted with the fruit sections and provides a yielding and cushioned grip of the rind sides of the fruit. Accordingly, the member T, which as here shown, is movable relative to member S, is provided with means R (Figures 5 and 13) for effecting such contact with the rind sides of the fruit while the cut faces of the fruit are urged by this means into contact with the stationary member S.

Whole fruit continuously fed into the apparatus is bisected by the knife means D, then treated to express the juice, as indicated in Figures 10, 11, 12 and 13. Consequently, by the addition of a second movable member U identical with member T and opposed thereto so that the member S extends therebetween, with the effective length of the member S of lesser extent than that of the opposed surfaces of members T and U, and the opposed surfaces of members S and U converging in the direction of movement of the fruit and in a direction transverse thereto, while the opposed surfaces of members T and U are converged transversely of said direction of movement, a second pressure path V, is formed between members S and U, and a feed passage W is provided between members T and U in advance of the two pressure paths P and V.

The fruit fed into feed passage W will become wedged according to size between the opposed surfaces of members T and U (see Figures 10 and 11) and be advanced against the knife means D which directs the halves into passages P and V where the halves are advanced by movement of members T and U and the juice expressed as the halves are compressed in said paths.

In this connection, it should be noted that the knife means feeds the halves into paths P and V so that the halves will become wedged therein according to size with the cut faces contacting the opposed sides of member S, which sides are perforated to permit the expressed juice to escape therethrough as the halves are advanced and compressed with their rind sides gripped by the rubber surfaces of the members T and U.

The foregoing is descriptive of one of several juice expressing units embodied in this apparatus. As shown in Figures 7 and 13, a second unit is provided by means of members S', T' and U', each identical with members S, T and U which coact to produce pressure paths $P_3$ and $V_3$ and a feed passage $W_3$ (Figure 7) serving the two pressure paths. The members U, T' and U' are provided with a cushioned fruit gripping means R' corresponding to the means R on member T.

Referring more specifically to the drawings, it will be seen that the juice expressing means B is mounted on and operated by means of a horizontal shaft 1 supported in bearings 3 and 3'. The drive means E for this shaft, as here shown, comprises a pair of chains 5 driving sprockets 6 on shaft 1, and in turn driven by sprockets 7 on the drive shaft 4 of the gear reduction unit J operated by the motor H.

The movable members T, U, T' and U', as shown in Figures 2, 5 and 7, are in the form of circular, concavo-convex disks 8, 9, 10 and 11 mounted in axially spaced relation on shaft 1 for rotation therewith with their convex sides formed to present frusto-conical surfaces.

The disk 8 forming the member T has a companion disk 8' of corresponding formation mounted on the shaft 1 so that the peripheral portions of the disks 8 and 8' abut. The disks 9 and 10 respectively comprising the members U and T' and are companioned as are disks 8, and 8', whereas disk 11 which comprises the member U' has a companion disk 11' associated therewith in the same manner as disk 8' is associated with disk 8.

The several disks have hub portions 12 which are keyed alike on the shaft 1 by means of the key 13, the paired disks having laterally enlarged rim portions 14 which abut and form a seal therebetween.

The feed passage W is defined between the opposed frusto-conical surfaces of the disks 8 and 9 as shown in Figure 7, and these surfaces are oppositely inclined so as to converge radially of the disks whereby the feed passage is V-shaped in cross section. The other feed passage $W_3$ is defined between the opposed frusto-conical surfaces of the disks 10 and 11.

Pressure path P is defined between the disk 8 and the surface of the stationary member S opposed thereto, the pressure path V being defined between the disk 9 and the surface member S opposed thereto. The pressure path $P_3$ is defined between disk 10 and the surface of stationary member S' opposed thereto, the pressure path $V_3$ being defined between disk 11 and the surface of member S' opposed thereto.

As shown, in Figures 2, 3, 5 and 10, the stationary members S and S' are substantially identical. The member S is disposed between the disks 8 and 9, whereas member S' is disposed between disks 10 and 11.

As best shown in Figures 3 and 10, each of the members S and S' comprises an upright transfer plate 15 formed as a segment of an annulus, and positioned between associated disks with its inner edge formed as a segment 15a of a hub and embracing a portion of a spacer ring 16 mounted on the shaft 1 between the disks 8 and 9. Bolts 17 (see Figure 7) are inserted through ears 18 on the members S and S', and turned in socket members 19 on a rigid frame 20 within the housing C, to hold the members S and S' in place, there being spacer sleeves 21 on the bolts 17. The plates 15, as shown in Figure 3, are removably held in place by means of bolts 23 in the same manner that bolts 17 support the portions of the members S and S' that are below the plates 15.

Each plate 15 is associated with an extraction structure 22, as shown in Figures 2, 3, 4a and 5, comprising, a pair of opposed, arcuate and perforated pressure plates 24 and 25 joined at corresponding upper edges by means of a web portion 26. This web portion has a tongue and groove connection 26' with the lower edge of the associated plate 15, whereby outer faces of these pressure plates are flush with the side faces of plate 15. The inner arcuate edges of pressure plates 24 and 25 are joined by a hub portion 27 integral with portion 26 and embracing the ring 16 in abutting relation to the hub segment 15a of associated plate 15. These two hub portions encircle about two thirds of the circumference of said ring and serve with the bolts 17 and 23 to hold the plates 15 and associated pressure plates 24 and 25 properly positioned between the respective rotatable disks 8, 9, 10 and 11.

The inlet ends of the pressure paths P, V, $P_3$ and $V_3$ start at the leading edges 28 (see Figure 3) of the transfer plates 15, while the outlet ends thereof are at the ends of the pressure plates 24 and 25 farthest removed from the plates 15. In this connection it should be noted that each plate 15 and its associated pressure plates 24 and 25, as here shown, have an arcuate extent between associated rotary disks, of approximately 180°, the pressure plates themselves having an arcuate extent of not less than 90° although these dimensions may be varied as desired.

In order that the pressure paths will present pressure surfaces which converge in the direction of travel of the fruit, which as here shown is counterclockwise (see Figure 3), the outer surfaces of the plates 15 and associated pressure plates 24 and 25 form continuous surfaces which gradually converge with the surfaces of the disk 8, 9, 10 and 11 opposed thereto in a counterclockwise direction from the inlet ends of the pressure paths to the outlet ends of said paths. Thus, the plates 15 being solid are gradually increased in thickness from the leading edges 28 thereof in the direction of advance of the fruit, while the perforated pressure plates 24 and 25 extend angularly in somewhat spiral paths between the disks opposed thereto, toward the outlet ends of the pressure paths and therefore have their outer surfaces disposed to gradually converge with the surfaces of the disks, in the direction of advance of the fruit. In other words, the perforated pressure plates 24 and 25 of each extraction structure diverge from one another radially with a gradual increase in the extent of divergence toward the outlet ends of the pressure paths, thus gradually constricting said paths in the direction of movement of the fruit so that the pressure on the fruit halves will increase but gradually in the direction of travel thereof, thereby effectively expressing the juice.

As the perforated pressure plates 24 and 25 are spaced apart, they are reinforced by integral web portions 29 at intervals therebetween. The ends of these plates of each pair, farthest removed from the plates 15, may have the space therebetween closed by means of a wall 30 which may be omitted if desired. When the spent pieces of fruit advance past the ends of the plates 24 and 25 into the discharge zones Z between the respective associated disks, they will gravitate into the compartment 32 in the lower end of the housing and drop through a discharge opening 33 and spout 34 onto the take off conveyor M.

As shown in Figures 2, 3 and 5, the knife means D includes a pair of circular knives 35 and 36 keyed on a horizontal shaft 37 mounted in bearings 38 and 39 and driven by a chain and sprocket drive means 40 from the shaft 1 (Figure 2). The knife 35 is disposed between disks 8 and 9 in feed passage W, whereas knife 36 is disposed between disks 10 and 11 in feed passage $W_3$, said knives being rotated in a clockwise direction while the rotary disks turn in the opposite direction. The leading edges of the transfer plates 15 are curved concavely to conform to the convex portions of the knives which are aligned with the plates as will be seen with reference to Figures 3 and 4, approximately one third of each knife being mounted in the feed passages associated therewith. Thus, whole fruit gripped at various positions within the feed passages (see Figures 3, 5 and 10) will be advanced against the cutting edges of the knives and bisected. In this connection it should be noted that due to the central positioning of the knives in said paths and the wedging of the fruit in centered position in the feed passages, a true bisecting of each piece of whole fruit is assured.

As shown in Figures 3 and 4, the cutting edge of each knife has short beveled sides 35' and the leading edge 28 of each transfer plate 15 is correspondingly bevelled so that the fruit halves will be prevented from sticking to the knives and being carried upward thereby away from the transfer plates 15. Consequently, the cut halves of the fruit are positively transferred from the knives to the plates 15 which in turn guide the fruit halves into the portions of the pressure paths between the pressure plates 24 and 25 and the disks associated therewith.

As a means for confining the fruit halves within the pressure paths, each transfer plate 15, as shown in Figures 3, 4 and 7, is provided with flanges 42 extending laterally outward from the outer arcuate edge thereof. Similar flanges 43 are provided on the outer margins of the pressure plates 24 and 25 and coact with flanges 42 to close the outer margins of the pressure paths, thus preventing the fruit from being thrown out of the pressure paths and dropping into the juice well 44 at the lower end of the housing C.

Figures 3 and 4 show how the flanges 42 are provided with extension portions 44' ranging upwardly from the plates 15 along opposite sides of the knives D in close proximity thereto to prevent cut fruit from being carried up by the knives and to assure the transfer of the cut sections from the knives into the spaces between the plates 15 and the disks opposed thereto, or in other words, into the pressure paths.

As shown in Figures 1 and 3, whole fruit is discharged from like conveyors 45 and 46 which comprise the feed means A, through like inlet openings 47 and 48, into like feed chutes 49 and 50 (see Figure 7) which are inclined downwardly from said opening. Each of the feed chutes has a V-shaped bottom wall 51 which centers the fruit and guides it into the centers of the V-shaped feed passages W and W₃. Each chute has a tapered extension 53 which is somewhat curved and positioned in the intake end of the associated feed passage as shown in Figures 3 and 7, said extension being V-shaped in cross section to effect a centered feed of the fruit. The fruit rolls down the chutes 49 and 50 onto the extensions 53 and according to diameter, each piece of fruit will be stopped and become wedged between the opposed rotary disks forming the feed passages, then advanced against the rotary knives. Thus, the fruit is picked up from the extensions 53 by the rotary disks which hold each piece properly centered regardless of diameter. Due to the radial depth of the feed passages between the rotary disks, fruit over a large range of different sizes may be handled with the one apparatus without necessitating adjustment. However, it should be noted that the size range may be varied by varying the spacing of the disks and stationary elements or by substituting disks and stationary elements having differently inclined surfaces as required.

As a means for washing and sterilizing interior and inaccessible parts of the apparatus from the center outwardly without disassembling the apparatus, conduit members 54 are mounted beneath the feed chutes 49 and 50 by means of bolts 52 corresponding to bolts 17, as shown in Figure 8. These conduit members are closed and sealed on their upper sides by the extensions 53 as best shown in Figure 3. The inner ends of the conduit members 54 are provided exteriorly with arcuate hub portions 55 which embrace the rings 16 on shaft 1 and fill the gaps between the hub segments 15a and 27 as shown in Figure 3. In this connection it should be noted that as shown in Figures 3, 5, 6 and 7, the hub portions 15a, 27 and 55 are circumferentially spaced from the outer periphery of the spacer rings 16 so as to form annular washing passages 56. These passages are centrally enlarged by complementary circumferential grooves 57 formed in the opposed surfaces of rings 16 and said hub portions. As shown in Figures 5 and 6, fiber washers 58 are interposed between the opposed rotary disks and the hub portions 15a, 27 and 55, said washers bearing on the surfaces of the disks opposed thereto.

Pipes 59 are mounted on the housing C, and adapted to be connected in any suitable manner with a source of water or other washing fluid under pressure (not shown), for directing the fluid through the conduit members 54, whence the fluid is sprayed through perforations 60 in the sides of said conduit members against the opposed surfaces of the disks for washing the apparatus. The pipes 59 also extend beneath the disks and are perforated as at 61 to direct a sterilizing spray upwardly onto the inner sides of the pressure plates 24 and 25.

As shown in Figures 3 and 8, passages 62 extend through the inner end walls of the conduit members 54 and the hub portion 55 so as to open into the grooves 57 and passage 56, thereby providing for washing and sterilizing around the shaft 1 between the disks and hub portions and adjacent parts.

An important provision of this invention is that of effecting a yielding or resilient and cushioned grip of the fruit. Accordingly, the means R and R' are provided whereby the fruit will be effectively gripped and advanced without necessitating that the rind or any other portion of the fruit be pierced, abraded or otherwise treated in a manner which would release objectionable amounts of rind oil or other undesirable components. This means provides a positive driving surface having a cushioned grip with the fruit and prevents the fruit from being thrown or dislodged from position in which it is held and advanced in the feed passages and pressure paths provided in the apparatus hereof. It also compensates by reason of the yielding thereof for fruit having rinds of varying thicknesses so as to prevent excessive pressures thereon and consequent release of undesirable components, and operates readily to discharge juices expressed thereon and to prevent accumulation of juices on the surfaces thereof exposed to the fruit. It further provides for yieldingly maintaining the cut faces of the fruit against the stationary and perforated pressure surfaces in such manner that excessive pressures incident to desired juice expressing pressure, are prevented, with the result that release of undesirable components of the fruit regardless of varying sizes thereof and differential rind thickness is effectively curtailed.

As here provided the means R and R₁, are each in the form of a substantially flat annulus 63 of soft or semi-soft rubber or synthetic rubber which is vulcanized or otherwise fixed to each of the rotatable disks 8, 9, 10 and 11 so as to cover the effective fruit-contacting surfaces thereof.

Each rubber annulus 63, as shown in Figures 14 and 15, is formed with a series of concentric ribs 63a forming annular grooves 63b therebetween. In order that the fruit will be positively advanced and prevented from being thrown upwardly or outwardly by centrifugal force responsive to rotation of the disks, each rib 63a is formed with a series of small resilient teeth 63c of an inverted V-shape in cross section which extend diagonally thereacross in integral formation therewith, as shown in Figures 14 and 15. These resilient teeth form with radial lines an angle of about 65 degrees and thus effectively resist movement of the fruit radially and outwardly of the disks during advance of the fruit, also dispose the small grooves 63a therebetween so that juice will readily run off the teeth and from said small grooves. However, the shape and angular disposition of these teeth or knurls may be varied provided they have the effect of gripping the fruit and holding it against displacement from the prescribed paths through the machine and do not subject the fruit to release of undesirable components.

Another important feature of this invention is the provision of perforations in the pressure plates 24 and 25 which are designed to effect a maximum take-off of pure juice with a minimum of abrasion of the fruit and consequent release of undesirable quantities of pulp or other components of the fruit. These perforations also cause the major amount of the expressed juice to pass directly therethrough into the space between the opposed pressure plates 24 and 25, thus directing the juice into channels or paths separated from the pressure paths in which the fruit is pressed. Consequently, elongated perforations 64 are formed in the pressure plates 24 and 25 and extend diagonally therethrough as shown in Figure 13, in a direction opposite that in which the fruit is advanced past the perforations. Thus, the edges of the perforations at the intake ends do not have the gouging effect that would release portions of the rind and pulp and force such portions through the perforations as would take place if the perforations extended in the direction of advance of the fruit or at right angles thereto.

The entire operation of one unit of the apparatus hereinbefore described in detail will be apparent with reference to the diagrammatic illustrations in Figures 10, 11 and 12. Figure 10 shows the progress and treatment of the larger fruit designated O from the time it enters the apparatus up to the discharge thereof into the discharge zone Z.

Figure 11 shows how the smaller fruit designated O' is treated in expressing the juice therefrom.

The zones through which the larger fruit O are advanced are nearer to the outer peripheries of the rotary disks, whereas the zones of movement of the smaller fruit O' are nearer to the axis of these disks as will be apparent with reference to Figure 12, wherein the large fruit zone is substantially on the line A—A and the small fruit zone is substantially on the line B—B.

Figure 13, as a developed section taken on the line 13—13 of Figure 3, shows the treatment of the fruit throughout the four pressure paths P, V, $P_3$ and $V_3$ as provided by the two units (see parts T, S, U, T', S' and U'). From a consideration of Figures 10, 11, 12 and 13, in the light of the foregoing detailed description of the apparatus, the complete operation thereof will be clearly understood.

It should be noted that the rubber members 63 providing the yieldable fruit gripping surfaces on the rotary disks 8, 9, 10 and 11 may be provided on the exposed surfaces as shown in Figure 15, with a lamination or coating 63d of less yieldability and softness than the body of the rubber members, to reduce wear, yet provide a yieldable gripping surface.

A modified form of this invention as shown in Figures 16 and 17 differs from the previously described form only as to the provision of means for segregating the juices. Consequently, all parts of this apparatus other than those parts providing the segregating means are identified by the same reference characters as in the previously described form of the invention. The segregating means makes it possible to separate the juices expressed from the fruit at different points in the pressure paths, so that juice expressed at one range of pressures may be separated from juices expressed at another range of pressures, and separately taken off, thereby obtaining different grades of juices. As here provided, the juices are separated into two groups by means of certain partitions 67' of a series of transverse partitions 67 between the pressure plates 24 and 25, and two collection compartments 68 and 69, having separate take-off conduits 70 and 71. The compartment 68 is arranged to receive juice expressed over a short range at points approximately midway of the pressure paths, thus segregating this juice from the juice initially and finally expressed during travel of the fruit in the pressure paths. This arrangement may be varied to segregate the juices at one or more points in the pressure paths as desired depending upon the nature of the fruit and the grades of juices desired. The two opposed partitions 67' as here shown are spaced apart at a point approximately centrally of the ends of the arcuate pressure plates 24 and 25 and are longer than the other partitions to confine all of the juice expressed between them to discharge into the collection compartment 68.

Another modified form of the invention shown in Figures 18, 19, 20, 20a and 21, provides stationary knives 73 and 73' but otherwise is of the same construction as the apparatus shown in Figures 1 through 15 and therefore has the corresponding parts thereof designated by the same reference characters. Figure 19 shows the manner in which the two knives 73 and 73' are mounted on a post 74 by means of a bolt 75 and spacer sleeve 76, to bisect the fruit. Figure 18 shows the location and arrangement of the knife 73 with respect to the associated plate 15 and other elements of one pressure unit of the machine, the other knife being identically arranged with respect to the other unit.

Figures 20 and 20a show the cross sectional shape of each of the knives and the tongue and groove interlocking means 77 between the plate 15 and back edge of the knife.

Figure 21 shows the manner in which each knife is detachably mounted so that it may be readily removed for sharpening or knife renewal purposes, there being a projection 78 on the lower end of the knife interlocking with the hub member 15a in which latter a depression 79 receives the projection 78.

The knives 73 and 73' have concavely curved cutting edges extending angularly in the direction of movement of the fruit to intersect the fruit and bisect it as it is advanced toward the pressure paths which latter are identical with the pressure paths in the first described form of the invention. Each knife is beveled from the cutting edge to the back edge which latter abuts the plate 15. Each knife is therefore gradually increased in cross sectional thickness from the cutting edge to the back edge thereof in the direction of the travel of the fruit. The plates 15 are correspondingly beveled so that the pressure paths commence at the cutting edges of the knives and gradually decrease in width in the direction of travel of the fruit in the same manner as provided in the first described form of this invention. In all other respects this form of the invention is operated in the same manner as the first described form.

The angle or position of the stationary knives 73 and 73' may be varied as desired, as well as the dimensions thereof, provided the knives will bisect the fruit uniformly and guide the fruit halves into the associated pressure paths in which the juice is expressed.

An important provision of this invention is the gripping and advancing of the fruit, both as whole and divided pieces, with resilient and yieldably cushioned surfaces as here shown by means of the rubber or synthetic rubber elements on the rotary disks. This cushioned gripping action makes it possible to effectively grip and advance the whole fruit in one continuous movement to the knife means then advance the fruit halves through the pressure paths, without piercing, abrading, or otherwise treating the rind in a manner which would cause objectionable amounts of rind oil to be released into the juice. Moreover, this yieldable gripping operation makes it possible to subject the fruit sections to greater pressure with a consequently greater juice yield, without expressing objectionable amounts of rind oil and pulp.

In order to insure a positive and continuous movement of the fruit against the bisecting knives, and likewise through the pressure paths, the fruit contacting faces of these cushioned surfaces are made of irregular formation, for example, with ribs, grooves, and teeth, as shown in the rubber members 63 (Figures 14 and 15). The angles of these irregular formations to radial lines are important and are such that the fruit will be held against outward dislodgement from normally gripped position while being forced against and past the knife means as well as while the bisected fruit is being advanced through the pressure path. Thus, any irregular surface formation of the cushioning members which will serve the foregoing purposes without puncturing the fruit or abrading or subjecting the rind to such treatment as would release objectionable amounts of oil and pulp is within the purview of this invention.

Various surface formations of the resilient gripping elements have been found to be satisfactory. Among the satisfactory formations are those shown in Figures 22 through 26.

In Figures 22, 23 and 24 a resilient rubber element 80 subject to use in the same manner as the rubber elements 63, is shown mounted on a rotary disk 81 corresponding to disks 8, 9, 10 and 11. Instead of being provided with concentric ribs as on the members 63, the rubber member 67 is provided with a series of small resilient fruit-gripping knobs or protuberances 82 on the fruit contacting surface 83 thereof. As in the rubber members 63, the surface 83 of the member 80 may be provided as a layer or lamination 83' of stiffer rubber (greater shore) than in the body of the member, this layer being indicated by the heavy line on the surface 83 and knobs 82. Arranged in closely spaced relation these protuberances will effectively grip and advance the fruit in paths predetermined by the size of the fruit, throughout the feeding, cutting and pressure paths defined in the apparatus, assuring that the fruit pieces will not be dislodged or moved or thrown radially or otherwise outwardly from the positions in which such pieces become wedged between the opposed surfaces of the fruit advancing and pressure members.

As here shown, the protuberances 82 are arranged in spaced rows ranging spirally across the member 80 in opposite directions. The oppositely directed and intersecting spiral lines r and r' in Figure 22 delineate these spiral rows and show how the rows intersect. With this right and left arrangement of the spral rows, the rotary disk 81 may be rotated in either direction or mounted on either side of the associated stationary member, and will operate to restrain the fruit from being dislodged and moved outward between the disks members during the cutting operation and while advancing through the pressure paths.

Assuming that the disk 81 is employed in the apparatus in place of the rotary disk shown in Figure 3 and is rotated counterclockwise, it is apparent that the spiral rows of protuberances 82 delineated by the lines r will force the fruit against the knife and hold the fruit in place during the entire advance of the fruit through the apparatus, as such rows act as restraining ridges against the sides of the fruit opposed to the outer peripheries of rotary disks. If rotated in the opposite direction, the rows delineated by the lines r' will be operative to hold the fruit in place. The protuberances may, as here shown, be progressively increased in size and outward extent from the surface 83, from the inner to the outer ends of the rows, so that the protuberances nearer to the outer periphery of the member 80 are larger and of greater outward extent and spaced apart a greater extent than the protuberances nearer to the inner ends of the rows. This arrangement provides for an effective gripping of the fruit by the protuberance according to the size of the fruit and the size of the protuberances, the larger fruit being gripped and held by the larger protuberances spaced apart a greater distance than the smaller protuberances while the latter likewise grip and hold the smaller fruit.

As a means, which in cooperation with the protuberances 82, provides for increasing the yield of juice and preventing an appreciable amount of juice from being carried off by the spent fruit discharged from the pressure paths, the perforated pressure plates may be constructed according to the plate 84 shown in Figures 22 and 24, with a series of arcuate grooves 85, which are concentric with the axis of the rotary disk 81 on the fruit contacting surface 86 of said pressure plate. These grooves extend along the pressure path formed between the disk 80 and the pressure plate, in the direction of travel of the fruit toward the end of the pressure path so as to be effective for a considerable length of the last part of said path where the greater and final pressure is exerted to complete the juice extracting operation.

The protuberances 82 and the grooves 85 are so related that portions of the cut faces of the fruit sections will be pressed by the protuberances into the grooves while the fruit sections are advanced along the grooves, as will be apparent with reference to Figure 24, during the final squeezing action in the pressure path. This will confine the finally expressed juice to the grooves which in being formed with elongated perforations 87 will cause the finally extracted juices to be discharged from the grooves without being carried off with the spent fruit. In other words, the grooves and protuberances enable the fruit sections to be subjected to a greater pressure and squeezing action to extract all of the juice before the fruit is discharged. Moreover, these grooves provide for the accommodation of fruit having thick rinds in such manner that compression of portions of the fruit into the grooves will assure a final yield of all of the juice without contamination by the rind oils.

Another modified form of the invention as shown in Figures 25 and 26 provides a different form of gripping member 88 of rubber or similar nature, for the rotary disk 89 corresponding to disks 8, 9, 10 and 11, wherein instead of the cencentric ribs as in gripping member 63 or the protuberances in gripping member 80, the fruit contacting surface 90 is formed with a series of resilient spiral ribs 91. These ribs serve to effectively grip the fruit and hold it against displacement from the prescribed paths of travel before and during the bisecting operation as well as during the movement of the fruit through the pressure passages.

A further modified form of this invention as diagrammatically shown in Figure 27 provides for a uniform final squeezing action during a considerable portion of the length of travel of the fruit in the pressure paths 92 and 93 formed in the same manner as in the apparatus shown in Figures 1 through 15, except for the aforesaid uniform pressure means. Thus, each operating unit of this modification will include a knife means 94, transfer plate 95, a stationary element 96 (corresponding to element S), movable elements 97 and 98 (corresponding to disks 8 and 9), except that the stationary element has surfaces 99 and 100 which are parallel to the opposed surfaces of the movable element in the direction of advance of the fruit. Thus, instead of the maximum pressure and squeezing action taking place at the extreme or discharge end of the pressure paths as provided in the first described form of this invention, as shown in Figure 10, for example, the maximum squeezing takes place over a comparatively long portion of the pressure paths preceding the discharge ends of passages 92 and 93. The line x in Figure 27, shows the extent of the portions of paths 92 and 93 which taper in the direction of travel of the fruit compared to the length of the surfaces 99 and 100 which is delineated by the line y. In obtaining maximum pressure in this manner a complete extraction of all of the juice is assured and no appreciable amount of the expressed juice will be carried off with the spent fruit as this juice will have drained through the perforations (not shown) in surfaces 99 and 100 before the spent fruit is discharged.

Figures 10 and 11 may also be considered as a diagrammatic illustration of another modification in which an endless belt or a pair of endless belts are employed with one or more knives and stationary elements S, in place of the rotary disks. Thus, an endless belt rotating on upright axes with one run inclined and opposed to the knife means D and one of the stationary elements S, would provide with the stationary element and knife means, a pressure path having surfaces converging in the direction of movement and transversely of said direction of movement, as diagrammatically illustrated in Figures 10 and 11. Obviously, two such belts would provide a feed passage leading into a pair of pressure paths, in that the opposed runs of the belts would be oppositely inclined to define a passage of V-shape in cross section, while the stationary element therebetween would provide surfaces converging with said runs in the direction of movement of the belts and in a direction transverse to said direction of movement. Thus, fruit of all sizes over a wide range would be treated alike to express the juice therefrom with substantially the same pressure applied to each piece regardless of size, in substantially the same manner as in the forms of the apparatus employing the rotary disks.

It is important to note that in having the rind engaging surfaces yieldable relative to the surfaces which contact the cut faces of the fruit, as provided in all embodiments of this invention, the desired expression of substantially all the juices without release of objectionable amounts of rind oils and other undesirable components of the fruit, regardless of differential sizes of the fruit and different peel thicknesses, is assured.

This invention also embodies a novel and advantageous method which consists in advancing fruit of different sizes simultaneously in different pressure paths defined according to the sizes of the fruit, and in causing all the fruit regardless of size to be subjected to a progressively increasing but yieldable pressure in said paths during movement of the fruit and with the smaller pieces of fruit subjected to as effective a pressure for expressing the juice as applied to the larger pieces and at the same time, during a continuous advance of the fruit in said paths. Moreover, this method includes the steps of simultaneously advancing the whole fruit in separate feed paths according to sizes, bisecting the fruit in each path as the fruit is advanced, then directing the fruit halves into similar separate pressure paths according to size and subjecting each piece of fruit in each path to substantially the same amount of pressure all in one continuous operation.

It should be noted that the movable pressure surfaces employed for compressing the fruit to express the juice in accordance with this invention, are engaged with the rind or peel surfaces only of the fruit halves and are resilient and yieldable and move with the fruit halves rather than relative thereto. This arrangement makes it possible to subject the fruit to such pressures which will express substantially all of the juice without treating the rind and pulp in such manner as would release undesirable amounts of oil and pulp. It also makes it possible to express the desired amount of juice and pulp from fruit halves in which the peel or rind varies in thickness over a wide range, to the exclusion of release of undesirable amounts of rind oil and pulp. Moreover, it provides for treating of fruit of various sizes over a wide range, without requiring exact grading of the fruit.

Thus, it is seen that in order to employ a yieldable pressure surface in the advantageous manner of this invention and to treat with cut sections of fruit of various sizes, yet express substantially all of the juice to the exclusion of undesirable components of the fruit, it is essential to provide the pressure paths between surfaces which converge in a direction transverse to the direction of movement of the fruit sections as well as in said direction of movement. Otherwise, in a pressure path converging only in the direction of movement of the fruit and formed with a yieldable fruit contacting surface, unless the fruit sections are of substantially the same size, the larger sections will move the yieldable surface such that the pressure against the smaller fruit sections will be ineffective to express desired amounts of juice therefrom, thereby wastefully discharging the small fruit before it is spent.

I claim:

1. In a fruit juice extractor: a stationary member; a rotatable member mounted on an axis, said rotatable member having an annular surface diverging outwardly relative to said axis, said stationary member having a perforated surface opposing a portion of said annular surface in converging relation therewith in an arcute path to form a path having a wide end and a narrow end; and means for feeding fruit halves to said wide end in the direction of convergence of said surfaces, with the cut faces engaging one of said surfaces, to cause the fruit to be confined therebetween and advanced toward said narrow end for expressing the juice through said perforations; the surface of said stationary member terminating adjacent said narrow end to release the spent fruit.

2. In a fruit juice extractor: rotatable means providing a pair of opposed, oppositely inclined surfaces forming therebetween an annular space; and a stationary member, intermediate said surfaces dividing said space into a pair of pressure paths; said stationary member having perforations through which the juice may pass; opposite sides of said stationary member diverging toward said surfaces at an angle which progressively increases in the direction of relation of said rotatable means whereby said paths taper in the direction of rotation of said rotatable means as well as transversely thereto.

3. In a fruit juice extractor: a pair of rotatable members having opposed, oppositely inclined surfaces forming therebetween an annular space; a stationary member intermediate said surfaces, dividing said space into a pair of paths; opposite sides of said stationary member diverging toward said surfaces at an angle which progressively increases in the direction of rotation of said rotatable members whereby said paths taper in the direction of rotation of said rotatable members as well as transversely thereto; feeding means for passing whole fruit to said space for wedging between said surfaces; and cutting means between said feeding means and said stationary member aligned with said stationary member for halving the fruit as it is advanced by said rotatable members; whereby rotation of said rotatable members thereafter advances the fruit halves toward the narrow end of said paths and the decreasing width of said paths causes expression of the fruit juice.

4. In a fruit juice extractor: a pair of members; means mounting said members for rotation about a common axis; said members having opposed oppositely inclined surfaces forming therebetween an annular fruit-receiving space which progressively decreases in width toward said axis; and means interposed between said members, said means having side surfaces which converge with the opposed surfaces of said members to define converging pressure paths separated by said interposed means and in which the fruit is squeezed and advanced responsive to rotation of said members.

5. In a fruit juice extractor: a pair of members; means mounting said members for rotation about an axis; said members having opposed oppositely inclined surfaces forming therebetween an annular fruit-receiving space which progressively decreases in width toward said axis; and an arcuate member of lesser arcuate extent than said space mounted between said members and defining therewith a pair of pressure paths; said arcuate member having surfaces which converge with surfaces of said rotary members opposite thereto in the direction of advance of said fruit providing wide inlet ends for said paths and narrow outlet ends for said paths; and means for rotating said rotary members to advance the fruit through said paths.

6. In a fruit juice extractor: a pair of members; means mounting said members for rotation about a common horizontal axis; said members having opposed oppositely inclined surfaces forming therebetween an annular fruit-receiving space which progressively decreases in width toward said axis; an arcuate member of lesser arcuate extent than said space mounted between said members and defining therewith a pair of pressure paths; said arcuate member having surfaces which converge with surfaces of said rotary members opposite thereto in the direction of advance of said fruit providing wide inlet ends for said paths and narrow outlet ends for said paths; means for rotating said rotary members to advance the fruit through said paths; and cutting means in said annular space for cutting whole fruit advanced by and between said rotary members and guiding the cut sections of fruit into said paths during rotation of said rotary members.

7. In a fruit juice extractor: a pair of members for contacting and moving fruit therebetween; means forming a resilient and compressible surface on at least one of said members for effecting a cushioned grip of the fruit; means mounting said members for rotation about a common axis; a stationary member having perforate walls mounted between said members and defining therewith a pair of arcuate pressure paths; the opposed surfaces of said members converging in a direction transverse to the direction of movement of the fruit; said walls of said stationary member converging with said surfaces in the direction of movement of the fruit in said paths.

8. In a fruit juice extractor: a pair of movable members for contacting and moving fruit therebetween; means forming opposed resilient and compressible surfaces on said members for effecting a cushioned grip of the fruit; means mounting said members for rotation about a common axis; a stationary member having perforate walls mounted between said members and defining with said surfaces a pair of arcuate pressure paths; said surfaces converging in a direction transverse to the direction of movement of the fruit; said walls of said stationary member converging with said surfaces in the direction of movement of the fruit in said paths; and cutting means mounted between said surfaces in advance of said stationary member and against which whole fruit is moved and bisected upon rotation of said members; the halved fruit moving into said paths.

9. In a fruit juice extractor: a pair of members for contacting and moving fruit therebetween; means forming a resilient and compressible surface on at least one of said members for effecting a cushioned grip of the fruit; means mounting said members for rotation alike about a common axis; a stationary member having perforate walls mounted between said members and defining therewith a pair of arcuate pressure paths; the opposed surfaces of said members converging in a direction transverse to the direction of movement of the fruit; said walls of said stationary member converging with the surfaces of said rotary members in the direction of movement of the fruit in said paths; and a stationary knife mounted between said rotary members for cutting fruit moved thereagainst and guiding the cut fruit into said paths responsive to rotation of said members.

10. In a fruit juice extractor: a pair of movable members for contacting and moving fruit therebetween; means forming opposed resilient and compressible surfaces on said members for effecting a cushioned grip of the fruit; means mounting said members for rotation about a common axis; a stationary member having perforate walls mounted between said members and defining with said surfaces a pair of arcuate pressure paths; said surfaces converging in a direction transverse to the direction of movement of the fruit; said walls of said stationary member converging with said surfaces in the direction of movement of the fruit in said paths; and a rotary knife mounted between said surfaces for bisecting fruit advanced thereagainst and guiding the cut fruit into said paths responsive to rotation of said members and said knife.

11. In a fruit juice extractor; a pair of circular members; means mounting said members for rotation about a common horizontal axis in opposed facing relation one to the other; and means in cooperation with said members forming pressure paths about said axis through which fruit gripped by said members is moved to express juice therefrom responsive to rotation of said members; said last named means including a pair of perforate walls opposed to said circular members.

12. In a fruit juice extractor, a stationary member; a rotary member opposed thereto; defining therewith an arcuate pressure path about the axis of rotation of said rotary member for advancing and squeezing fruit therein to express juice therefrom responsive to rotation of said rotary member; said members having the path-forming surfaces thereof disposed to constrict the path in a direction transverse to the direction of movement of the fruit as well as in the direction of movement of the fruit; means for feeding fruit into said path; and means for rotating said rotary member to advance the fruit through said path; said stationary member having perforations through which juice may pass.

13. In a fruit juice extractor; a circular rotary member for contacting and advancing fruit through the extractor; means mounting said member for rotation about an axis; said member having a coniform surface around said axis; a perforate stationary member having a surface opposed to said coniform surface and defining therewith a pressure path which is gradually constricted in the direction of advance of the fruit; means for feeding fruit into said path and means for rotating said rotary member.

14. In a fruit juice extractor; a circular rotary member for contacting and advancing fruit through the extractor; means mounting said member for rotation about a horizontal axis; said member having a coniform surface around said axis; a stationary member having an arcuate surface opposed to said coniform surface and defining therewith a pressure path which is gradually constricted in the direction of advance of the fruit; means for feeding fruit into said path; means for rotating said rotary member; and means providing a resilient and compressible fruit contacting surface on said rotary member for yieldably gripping the fruit between said members.

15. In a fruit juice extractor; a pair of opposed circular disks mounted for rotation about an axis; said disks having opposed coniform surfaces forming an annular passage therebetween about said axis and which is gradually constricted radially of said disks to provide for a wedging grip of whole fruit of different sizes fed therebetween; a stationary member having perforate walls disposed between said surfaces and defining therewith a pair of pressure paths occupying a segment of said annular passage; said walls being angularly disposed to constrict said paths in the direction of movement of the fruit; and cutting means between said disks having a curved cutting edge ranging toward said axis in the general direction of advance of the fruit for bisecting whole fruit advanced thereagainst and guiding the fruit halves into said paths responsive to rotation of said disks; and means for rotating said disks.

16. In a fruit juice extractor; a pair of opposed circular disks mounted for rotation about an axis; said disks having opposed coniform surfaces forming an annular passage therebetween about said axis and which is gradually constricted radially of said disks to provide for a wedging grip of whole fruit of different sizes fed therebetween; a stationary member having perforate walls disposed between said surfaces and defining therewith a pair of pressure paths occupying a segment of said annular passage; said walls being angularly disposed to constrict said paths in the direction of movement of the fruit; and cutting means between said disks having a convexly curved cutting edge ranging toward said axis in the general direction of advance of the fruit for bisecting whole fruit advanced thereagainst and guiding the fruit halves into said paths responsive to rotation of said disks; and means for rotating said disks.

17. In a fruit juice extractor; a pair of opposed circular disks mounted for rotation about an axis; said disks having opposed coniform surfaces forming an annular passage therebetween about said axis and which is gradually constricted radially of said axis to provide for a wedging grip of whole fruit of different sizes fed therebetween; a stationary member having perforate walls disposed between said surfaces and defining therewith a pair of pressure paths occupying a segment of said annular passage; said walls being angularly disposed to constrict said paths in the direction of movement of the fruit; cutting means between said disks having a concavely curved cutting edge ranging inward to said axis in the general direction of advance of the fruit for bisecting whole fruit advanced thereagainst and guiding the fruit halves into said paths responsive to rotation of said disks; and means for rotating said disks.

18. In a fruit juice extractor: a pair of relatively movable members having respectively opposed surfaces converging in a direction transverse to the direction of movement and at a progressively decreasing inclined angle to form a pressure path having a wide end and a narrow end; means for feeding fruit halves to said wide end with the cut faces engaging one of said surfaces; and in the direction of convergence of said surfaces; to cause the fruit to be confined therebetween and advanced toward said narrow end and express the juice, the spent fruit being released and escaping at said narrow end, and means for segregating the juices expressed while the fruit is advanced.

19. In a fruit juice extractor: rotatable means providing a pair of opposed oppositely inclined surfaces forming therebetween an annular space; and a stationary member, intermediate said surfaces dividing said space into a pair of pressure paths or channels; opposite sides of said stationary member diverging oppositely with respect to said surfaces at a progressively increasing angle whereby said channels taper in the direction of rotation of said rotatable member as well as transversely thereto; said sides of said stationary member defining a juice discharge passage therebetween and having perforations for conducting juice into said passage.

20. In a fruit juice extractor: rotatable means providing a pair of opposed oppositely inclined surfaces forming therebetween an annular space; and a stationary member intermediate said surfaces dividing said space into a pair of pressure paths or channels, opposite sides of said stationary member diverging oppositely with respect to said surfaces at a progressively increasing angle whereby said channels taper in the direction of rotation of said rotatable member as well as transversely thereto; said sides of said stationary member defining a juice discharge passage therebetween and having perforations for conducting juice into said passage, said perforations extending diagonally through said sides in a direction opposite the direction in which the fruit is advanced past said perforations.

21. In a fruit juice extractor: a pair of members for advancing fruit in one direction; means mounting said members for movement in opposed spaced relation to one another; said members having opposed, plane surfaces for engaging and advancing fruit in said direction responsive to movement of said members; said plane surfaces converging transversely of said direction of advance of the fruit; cutting means arranged between said plane surfaces in the path of said advance for bisecting the fruit; and means arranged between said surfaces for defining with said surfaces a pair of pressure paths through which the bisected fruit is advanced and squeezed responsive to said movement of said members.

22. In a fruit juice extractor: a pair of members for advancing fruit in one direction; means mounting said members for movement in opposed spaced relation to one another; said members having opposed, plane surfaces for engaging and advancing fruit in said direction responsive to movement of said members; said plane surfaces converging transversely of said direction of advance of the fruit; cutting means arranged between said plane surfaces in the path of said advance for bisecting the fruit; and stationary means between said members adjacent said cutting means; said stationary means defining with said plane surfaces a pair of pressure paths which are constricted in the direction of advance of the fruit and through which the bisected fruit is advanced responsive to said movement of said members.

23. In a fruit juice extractor: a stationary member and a movable member having respectively opposed fruit contacting surfaces, means for moving said movable member, said surfaces converging in the direction of movement of said movable member and also converging in a direction transverse to said direction of movement thereby forming a path having a wide end and a narrow end as well as a wide side and a narrow side; said stationary member having perforations extending through the fruit contacting surface thereof; means for depositing fruit halves into the wide end of said path with the cut faces of such fruit halves engaging said perforated surface and with the peaks of such fruit halves engaging said movable member, said movement of said movable member causing the fruit confined between said fruit contacting surfaces of said members to be advanced toward said narrow end of said path for expressing the juice through said perforations; the surface of said stationary member terminating adjacent said narrow end of said path to relieve the spent fruit.

24. Apparatus as defined by claim 23 in which the fruit contacting surface of one of said members is resiliently yieldable.

25. Apparatus as defined by claim 12 in which the surface of said rotary member opposed to said stationary member is of resilient and compressible material to effect a cushioned gripping of the fruit, said material having a series of protuberant fruit gripping elements arranged in spaced rows ranging in opposite direction and angularly across the path of movement of the fruit.

26. Apparatus as defined by claim 12 in which the surface of said rotary member opposed to said stationary member is of resilient and compressible material to effect a cushioned gripping of the fruit, said material having a series of protuberant fruit gripping ribs extending spirally across the path of movement of the fruit.

27. In a fruit juice extractor: a pair of opposed rotary members; means mounting said members for rotation about a common axis, said rotary members having opposed surfaces which converge toward said axis to provide between said rotary members an annular wedge-shaped fruit receiving space such that fruit of different sizes deposited in said space will be wedged between said rotary members at different distances from said axis according to the size of the fruit and will be advanced upon rotation of said members; a stationary member between said rotary members and occupying a portion of said wedge-shaped space, said stationary member having walls which converge toward the opposed surfaces of said rotary members in the direction of rotation of said rotary members to define therewith a pair of converging paths on opposite sides of said stationary member; and cutting means between said rotary members in advance of said stationary member to bisect fruit advanced by said rotary members.

28. In a fruit juice extractor: a pair of opposed rotary members; means mounting said members for rotation about a common axis, said rotary members having opposed surfaces which converge toward said axis to provide between said rotary members an annular wedge-shaped fruit receiving space such that fruit of different sizes deposited in said space will be wedged between said rotary members at different distances from said axis according to the size of the fruit and will be advanced upon rotation of said members; a stationary member between said rotary members occupying a portion of said wedge-shaped space, said stationary member having walls which converge toward the opposed surfaces of said rotary members in the direction of rotation of said rotary members to define therewith a pair of converging paths on opposite sides of said stationary member; and a rotary cutter between said rotary members in advance of said stationary member to bisect fruit advanced by said rotary members.

29. In a fruit juice extractor: a pair of opposed rotary members; means mounting said members for rotation about a common axis, said rotary members having opposed surfaces which converge toward said axis to provide between said rotary members an annular wedge-shaped fruit receiving space such that fruit of different sizes deposited in said space will be wedged between said rotary members at different distances from said axis according to the size of the fruit and will be advanced upon rotation of said members; a stationary member between said rotary members occupying a portion of said wedge-shaped space, said stationary member having walls which converge toward the opposed surfaces of said rotary members in the direction of rotation of said rotary members to define therewith a pair of converging paths on opposite sides of said stationary member; and a stationary blade between said rotary members in advance of said stationary member to bisect fruit advanced by said rotary members, the back of said blade abutting the leading edge of said stationary member and the cutting edge of said blade facing in the direction opposite to the direction of rotation of said rotary members.

30. In a fruit juice extractor: a pair of opposed members; means mounting said members for rotation about an axis; said members having opposed surfaces converging in a direction toward said axis for gripping and advancing fruit therebetween in different arcuate paths variously radially spaced from said axis according to the size of the fruit; knife means between said surfaces for cutting fruit during said advance; and a stationary member between said surfaces rearwardly of said knife means having opposite surfaces diverging in the direction of said advance to cooperate with said surfaces to express juice from the cut fruit during said advance.

References Cited in the file of this patent

UNITED STATES PATENTS

| | | |
|---|---|---|
| 115,112 | Seger | May 23, 1871 |
| 241,243 | Selwig | May 10, 1881 |
| 489,362 | Bornholdt | Jan. 3, 1893 |
| 620,286 | Dodge | Feb. 28, 1899 |
| 1,040,842 | Anderson | Oct. 8, 1912 |
| 1,159,187 | Day | Nov. 2, 1915 |
| 1,380,023 | Roussillon | May 31, 1921 |
| 2,146,158 | Scherer | Feb. 7, 1939 |
| 2,191,144 | Hornbostel | Feb. 20, 1940 |
| 2,235,028 | Leo et al. | Mar. 18, 1941 |
| 2,515,772 | Hewlett | July 18, 1950 |
| 2,538,590 | Polk | Jan. 6, 1951 |

FOREIGN PATENTS

| | | |
|---|---|---|
| 901,861 | France | Aug. 6, 1951 |